US010319241B2

(12) United States Patent
Lynar et al.

(10) Patent No.: US 10,319,241 B2
(45) Date of Patent: *Jun. 11, 2019

(54) MANAGING FLIGHT PATHS OF A SOARING AIRCRAFT WITH CROWD SOURCING

(71) Applicant: International Business Machines Corporation, Armonk, NY (US)

(72) Inventors: Timothy M. Lynar, Carlton (AU); Olivia J. Smith, Carlton (AU); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,634

(22) Filed: Jan. 12, 2018

(65) Prior Publication Data

US 2018/0137764 A1 May 17, 2018

Related U.S. Application Data

(63) Continuation of application No. 14/133,756, filed on Dec. 19, 2013, now Pat. No. 9,947,229.

(51) Int. Cl.
*G08G 5/00* (2006.01)
*G05D 1/08* (2006.01)
*G08G 5/04* (2006.01)

(52) U.S. Cl.
CPC ......... *G08G 5/0034* (2013.01); *G05D 1/0808* (2013.01); *G08G 5/0008* (2013.01);
(Continued)

(58) Field of Classification Search
CPC .. G08G 5/0034; G08G 5/0039; G08G 5/0008; G08G 5/0091; G05D 1/0808
(Continued)

(56) References Cited

U.S. PATENT DOCUMENTS 4,642,775 A  2/1987  Cline et al.
7,365,674 B2  4/2008  Tillotson et al.
(Continued)

OTHER PUBLICATIONS

Michael J. Allen, Victor Lin, "Guidance and Control of an Autonomous Soaring UAV", Apr. 2007 (Year: 2007).*
(Continued)

*Primary Examiner* — Isaac G Smith
(74) *Attorney, Agent, or Firm* — Fleit Gibbons Gutman Bongini Bianco PL; Jon A. Gibbons

(57) ABSTRACT

Disclosed is a novel system and method for adjusting a flight path of an aircraft. The method begins with computing a flight path of an aircraft from a starting point to an ending point which incorporates predicted weather effects at different points in space and time. An iterative loop is entered for the flight path. Each of the following steps are performed in the iterative loop. First lift data is accessed from a fine-grain weather model associated with a geographic region of interest. The lift data is data to calculate a force that directly opposes a weight of the aircraft. In addition, lift data is accessed from sensors coupled to the aircraft. The lift data is one or more of 1) thermal data, 2) ridge lift data, 3) wave lift data, 3) convergence lift data, and 4) a dynamic soaring lift data. Numerous embodiments are disclosed.

17 Claims, 10 Drawing Sheets

(52) U.S. Cl.
CPC ......... *G08G 5/0013* (2013.01); *G08G 5/0052* (2013.01); *G08G 5/0091* (2013.01); *G08G 5/04* (2013.01)

(58) Field of Classification Search
USPC .................................................. 701/4, 5, 10
See application file for complete search history.

(56) References Cited

U.S. PATENT DOCUMENTS

| | | |
|---|---|---|
| 7,711,457 B2 | 5/2010 | Caillaud |
| 7,742,847 B2 | 6/2010 | DeMers et al. |
| 8,200,377 B2 | 6/2012 | Marty et al. |
| 9,019,146 B1 | 4/2015 | Finley et al. |
| 9,171,473 B1 | 10/2015 | McNally et al. |
| 2006/0155432 A1 | 7/2006 | Brown |
| 2012/0209457 A1 | 8/2012 | Bushnell |
| 2013/0006533 A1 | 1/2013 | Lax et al. |
| 2013/0085672 A1 | 4/2013 | Stewart et al. |
| 2014/0129056 A1* | 5/2014 | Criado ............... G05D 1/105 701/4 |
| 2014/0267723 A1* | 9/2014 | Davidson, Jr. ......... H04N 7/183 348/147 |
| 2016/0155338 A1 | 6/2016 | Lynar et al. |

OTHER PUBLICATIONS

Steinberg, R., "Airline flight planning—The weather connection." Society of Automotive Engineers, Aerospace Congress and Exposition, Oct. 1981; Report No. SAE Paper 811067; Database: CSA Technology Research Database.

Mitre Corporation, "Trajectory Modeler from User Request Evaluation Tool (URET)," Jun. 2002, Database: IP.COM; IP.COM No. IPCOM000008420D.

Chemring Technology Solutions, "Intelligent Technologies," Copyright 2009-2013 Roke Manor Research Limited, Part of the Chemring Group.

SSA, Soaring Society of America, "Lift Sources," Copyright 2013 Soaring Society of America, Inc.

IBM, "Deep Thunder," http://en.wikipedia.org/w/index.php?title=IBM_Deep_Thunder@oldid=584573364 Categories: Power Architecture IBM.

Microscale Meteorology, http://en.wikipedia.org/w/index>php?title=Microscale_meteorology@oldid=540603396 Categories: Microscale meteorology Atmospheric science stubs.

Von Kaenel, M., et al., "Ikarns: Large-Scale Participatory Sensing at High Altitudes", Proceedings of the 12th Workshop on Mobile Computing Systems and Applications (HotMobile11), Mar. 1-2, 2011, pp. 1-6.

Michael J. Allen, Victor Lin, "Guidance and Control of an Autonomous Soaring UAV", Apr. 2007.

* cited by examiner

US 10,319,241 B2

MANAGING FLIGHT PATHS OF A SOARING AIRCRAFT WITH CROWD SOURCING

BACKGROUND

The present invention generally relates to flight paths of aircraft and more specifically to flight path of a soaring aircraft as it relates to lift forces.

Initially soaring and gliding was used to increase the duration of flights. Soon however, pilots attempted flights away from the place of launch improvements in aerodynamics and in the understanding of weather phenomena have allowed greater distances at higher average speeds. Long distances are now flown using any of the main sources of rising air: ridge lift, thermals and lee waves. When conditions are favorable, experienced pilots can now fly hundreds of kilometers before returning to their home airfields.

Gliders are used for tasks such as search and rescue, surveillance, transportation, and pleasure. Gliders are reliant on meteorological conditions to provide lift; subsequently the optimal route from A to B is often not direct.

SUMMARY

Disclosed is a novel system and method for flight path calculation based on fine-grained weather forecasting, nowcasting, and path searching. Based on continuously updated forecasts, the presently claimed invention determines a path to destination using detailed fine-grained information on current and future lift locations and wind direction.

In one example, a computer-implemented method for adjusting a flight path of an aircraft is described. The method begins with computing a flight path of an aircraft from a starting point to an ending point which incorporates predicted weather effects at different points in space and time. An iterative loop is entered for the flight path. Each of the following steps are performed in the iterative loop. First lift data is accessed from a fine-grain weather model associated with a geographic region of interest. The lift data is data used to calculate a force that directly opposes a weight of the aircraft. In addition, lift data may be accessed from sensors coupled to the aircraft. The lift data is one or more of 1) thermal data where air rises due to temperature, 2) ridge lift data where air is forced upwards by a slope, 3) wave lift data where a mountain produces a standing wave, 3) convergence lift data where two air masses meet, and 4) a dynamic soaring lift data where differences in wind speeds at various altitudes is used.

Adjustments to the flight path are calculated based on a combination of the lift data from the fine-grain weather model and the lift data from sensors and other weather data. In one example, crowdsourcing data is also used. These calculations can be performed on the aircraft, on other aircraft, ground stations, or a combination thereof. Also, adjustments to flight path can also be received from other aircraft. The flight path is adjusted based upon the adjustments that have been calculated. This flight path information, in another example is shared with other aircraft.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
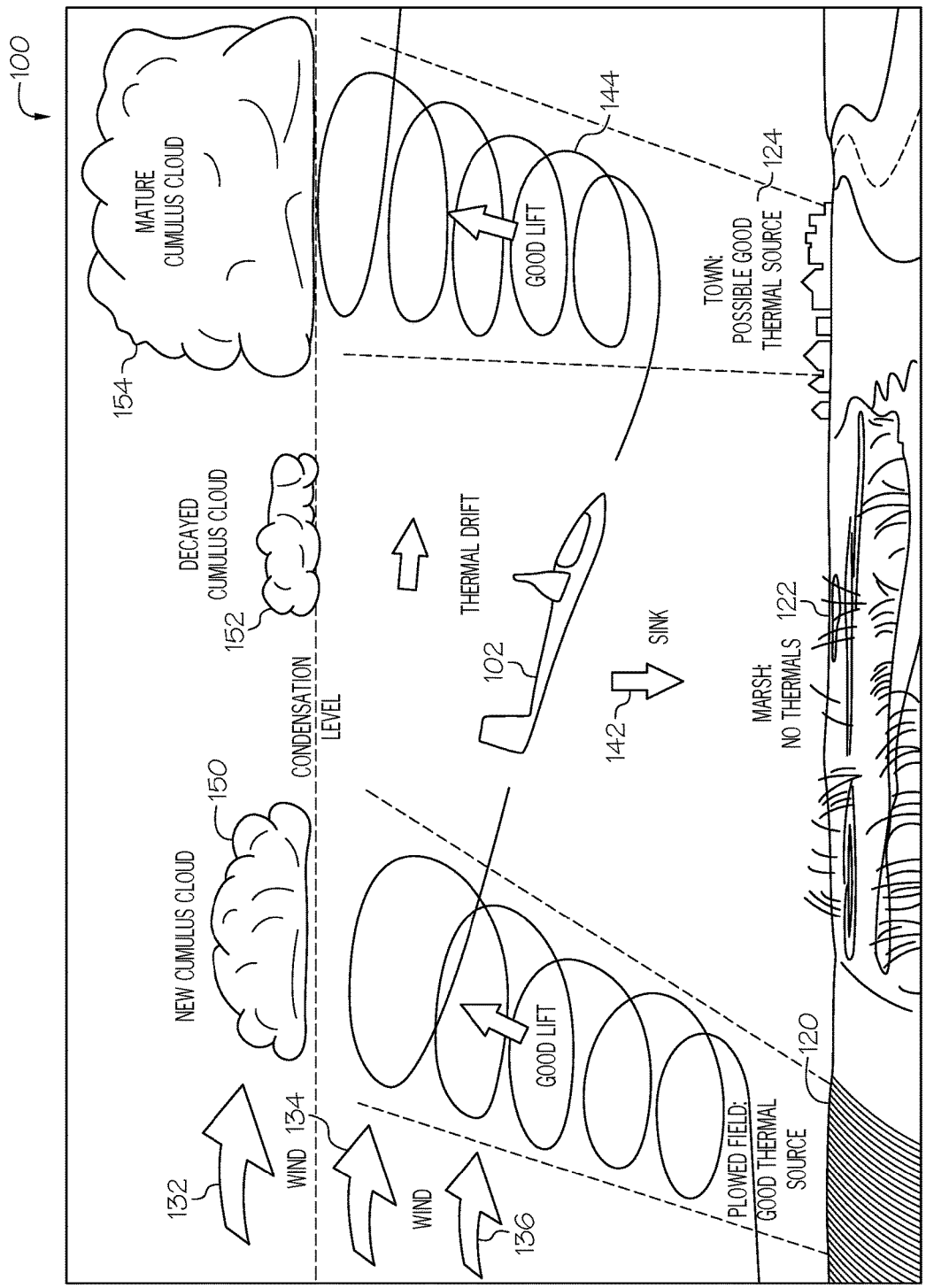
FIG. 1 is a diagram of a soaring aircraft using thermal lift.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

An important component to the claimed invention is "fine-grained weather forecasting." Predicting the weather accurately is a hard enough computing problem. Predicting the weather for a specific location down to a square kilometer—and how it will affect the people and infrastructure there—is a problem of a much different sort. And it's that sort of "hyper-local" forecasting that IBM's Deep Thunder provides.

Precision weather prediction or "fine-grained weather" forecasting was originally set up in the IBM in 1996. Currently the IBM technology is known as "Deep Thunder" See online URL (en.wikipedia.org/wiki/IBM_Deep_Thunder). Deep Thunder provides local, high-resolution weather predictions customized to weather-sensitive specific business operations. For example, it could be used to predict the wind velocity at an Olympic diving platform, or where there will be flooding and predict where mudslides might be triggered by severe storms. or damaged power lines up to 84 hours in advance. Unlike the long-term strategic weather forecasts that many companies rely on to plan business, Deep Thunder is focused on forecasts in small a geographic area with a very fine time granularity. For example, in 2001, IBM set up a test bed in the New York City metropolitan area. A 3D grid of thousands of blocks, each one cubic kilometer in size was setup. Calculations could be run on each cube of the grid to generate very local and precise predictions. The team also began working on the kind of modeling, forecasting, and data visualization innovations that could help a business make smarter logistical, planning and operational decisions, faster and with more confidence.

The presently claimed invention provides a novel system and method for flight path calculation based on fine-grained weather forecasting, nowcasting, and path searching. Based on continuously updated forecasts we are able to find a path to destination using detailed fine-grained information on current and future lift locations and wind direction.

Non-Limiting Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise.

The term "aircraft" is a machine that is able to fly by gaining support from the air. Aircraft includes unpowered gliders, balloons, dirigibles, and kites. Aircraft also includes powered fixed winged designs with one or more engines to produce thrust. The engines can run on fuel or be battery powered. Aircraft also includes powered rotorcrafts including helicopters.

The terms "comprises" and/or "comprising," specify the presence of stated features, steps, operations, elements, and/or components, but do not preclude the presence or addition of one or more other features, integers, steps, operations, elements, components, and/or groups thereof.

The term "crowdsourcing data" is data from a group of individuals typically that elect to share data for a specific flight path.

The term "fine-grained weather model" also known as "microscale meteorology" or "hyper-local forecasting" means a weather model is a model that is able to forecast weather to a small specific geographic region i.e., less than a kilometer for an immediate time period Time periods of a few seconds to few days is typical. This model forecasts smaller features, such as, individual showers and thunderstorms with reasonable accuracy, as well as other microscale phenomena. Fine-grained weather models have two important features—a defined geographic region and defined time period. From online URL (http://en.wikipedia.org/wiki/Microscale_meteorology)—"Microscale meteorology is the study of short-lived atmospheric phenomena smaller than mesoscale, about 1 km or less. These two branches of meteorology are sometimes grouped together as "mesoscale and microscale meteorology" (MMM) and together study all phenomena smaller than synoptic scale; that is they study features generally too small to be depicted on a weather map. These include small and generally fleeting cloud "puffs" and other small cloud features. Microscale meteorology controls the most important mixing and dilution processes in the atmosphere. Important topics in microscale meteorology include heat transfer and gas exchange between soil, vegetation, and/or surface water and the atmosphere caused by near-ground turbulence. Measuring these transport processes involves use of micrometeorological (or flux) towers. Variables often measured or derived include net radiation, sensible heat flux, latent heat flux, ground heat storage, and fluxes of trace gases important to the atmosphere, biosphere, and hydrosphereish explained."

The term "geographic region" means a defined portion of the world. A destination region could be any small predefined geographic region including a postal code, a stadium, or an area defined by global position system (GPS) coordinates, in which lift data for a flight path is used.

The term "lift" is the force that directly opposes the weight of an airplane and holds the airplane in the air. Lift is generated by every part of the airplane, but most of the lift on a normal airliner is generated by the wings. See online website (http://www.grc.nasa.gov/WWW/k-12/airplane/lift1.html). Soaring aircraft and soaring birds use lift as an energy source to stay aloft.

The term "lift data" means data from weather and sensor and includes data wherein the lift data includes at least one of: 1) thermal lift data where air rises due to temperature, 2) ridge lift data where air is forced upwards by a slope, 3) wave lift data where a mountain produces a standing wave, 4) convergence lift data where two air masses meet, and 5) a dynamic soaring lift data where differences in wind speeds at various altitudes is used.

The term "sensor" is a device that can measure physical attributes of external environmental converting readings of light, motion, temperature, magnetic fields, gravity, humidity, moisture, vibration, pressure, electrical fields, sound, and other physical aspects of the external environment into values related to lift data that is usable by a computer. Lift data is derived from measuring heat transfer and gas exchange between soil, vegetation, and/or surface water and the atmosphere caused by near-ground turbulence. Variables often measured or derived include net radiation, sensible heat flux, latent heat flux, ground heat storage, and fluxes of trace gases important to the atmosphere, biosphere, and hydrosphere.

The term "time period" means a duration, such as those measured in minutes, in which a lift data is deemed relevant.

Lift Sources

Referring to FIG. 1, shown is a diagram 100 of a soaring aircraft 102 using thermal lift. Thermal lift is dependent on solar energy and the relative heating of surface structures. In this example, the general wind direction is shown moving from left to right 132, 134, 136. Three geographic features of a farm with a plowed field 120, a marsh 122 and a town 124 are shown. Better lift 140 is forecasted and/or measured over a plowed field 120 as shown. Poorer lift is forecasted and/or measured over marsh 122. The better lift 144 is again forecasted and/or measured over a town 124 as shown. Lift sometimes can be predicted based on cloud type. Shown above each geographic region is a stage of formation of cumulus cloud. Specifically, geographic region over the plowed field 120 has a new cumulus cloud formation 150. The geographic region over the marsh 122 illustrates a decayed cumulus cloud formation 152. And the region over the town 124 illustrates a mature cumulus cloud formation 154.

Figure 2:
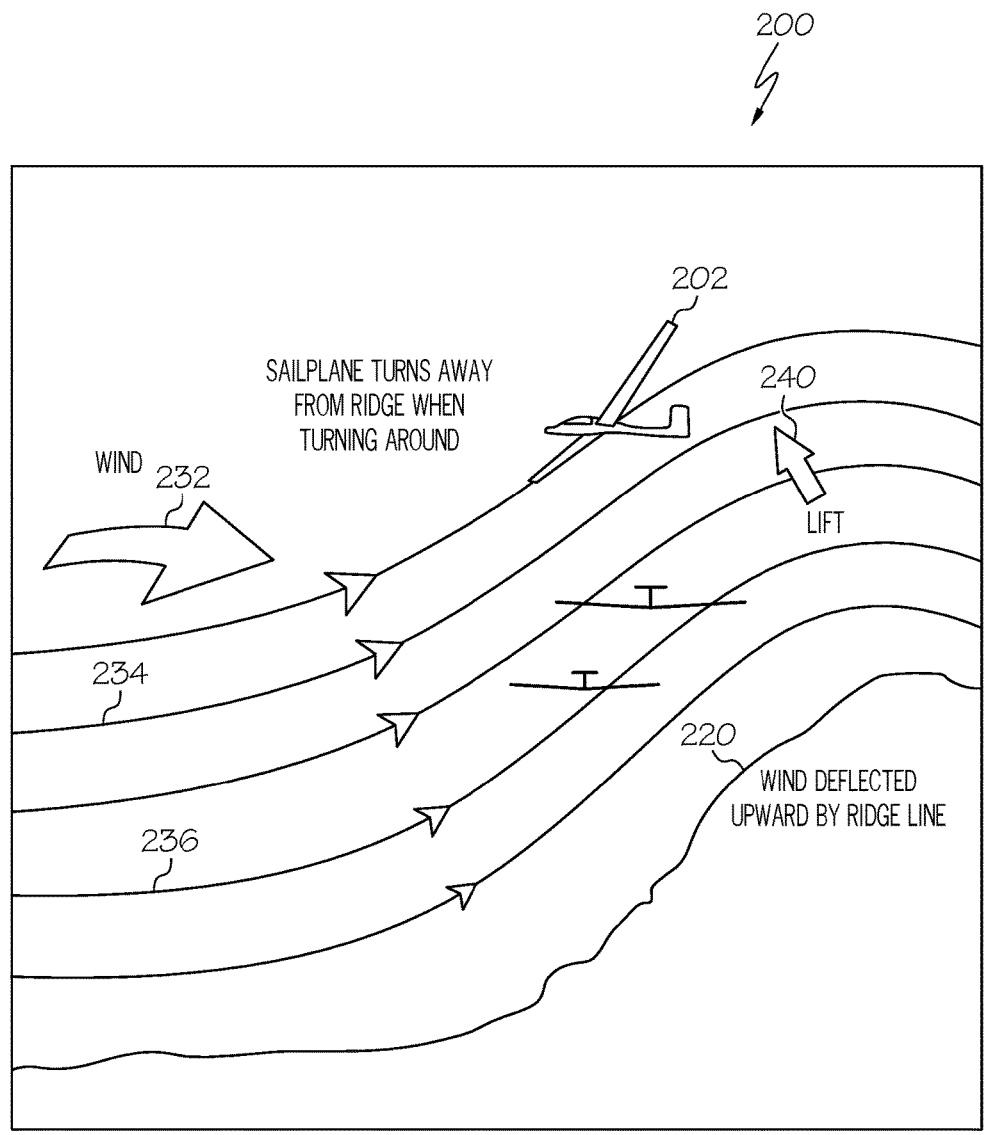
FIG. 2 is a diagram of a soaring aircraft using ridge lift.

FIG. 2 is a diagram 200 of a soaring aircraft 202 using ridge lift 240 also known as slope lift. Ridge lift is dependent on wind blowing against a geographic feature should as a mountain, hill, cliff or ridge line. Again, in this example, the general wind direction is shown moving from left to right 232, 234, 236. In this example the wind is deflected upward because of the ridge line 220.

Figure 3:
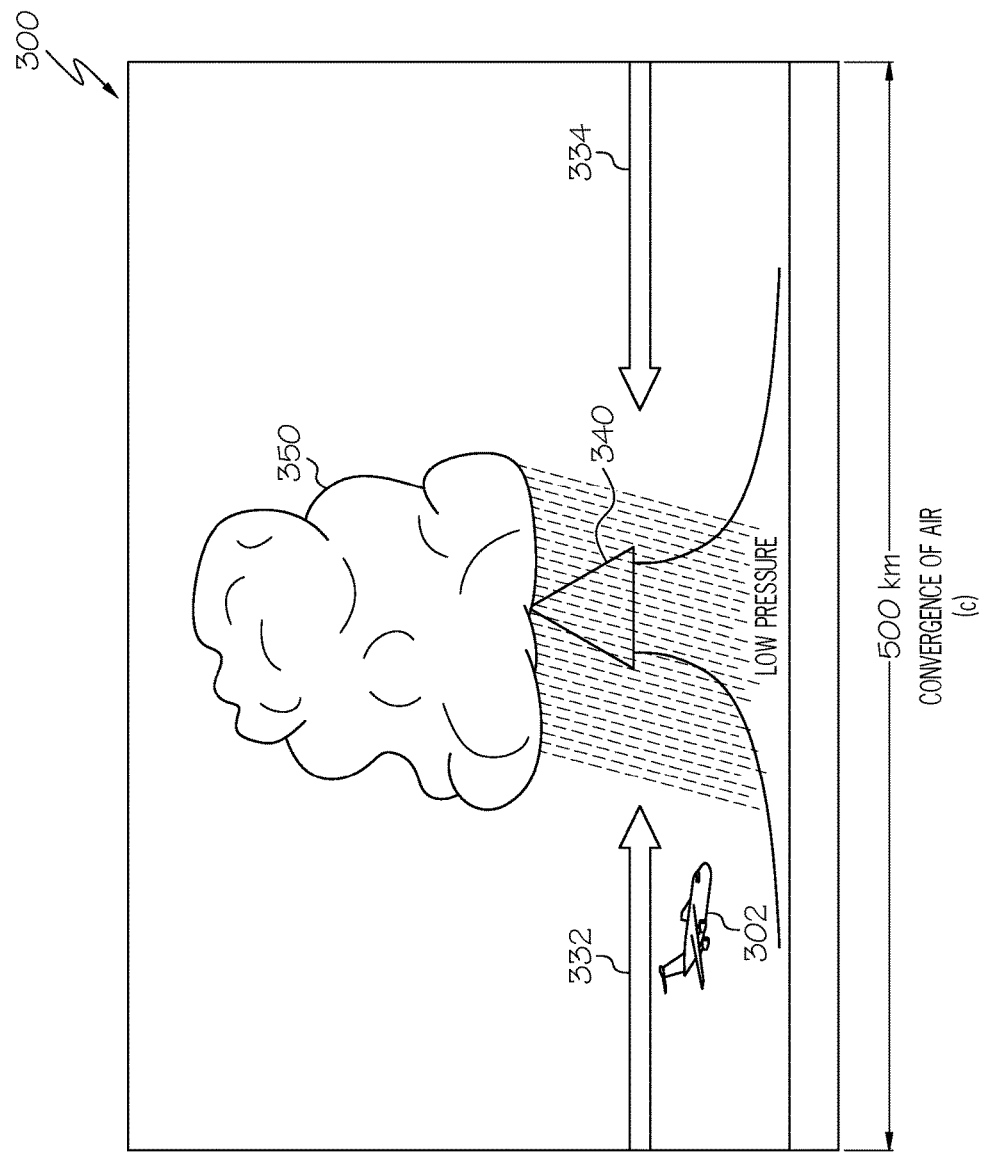
FIG. 3 is a diagram of a soaring aircraft using convergence lift.

FIG. 3 is a diagram 300 of a soaring aircraft 302 using convergence lift 340. Convergence lift is dependent on wind or air massing blowing in different directions. In this example two air masses 332 and 334 traveling in opposite directions are shown. As the air masses converge, convergence lift 340 is created. Again as in other types of lift discussed herein, cloud formations 350 may be used to help predict and/or measure this type of lift.

Figure 4:
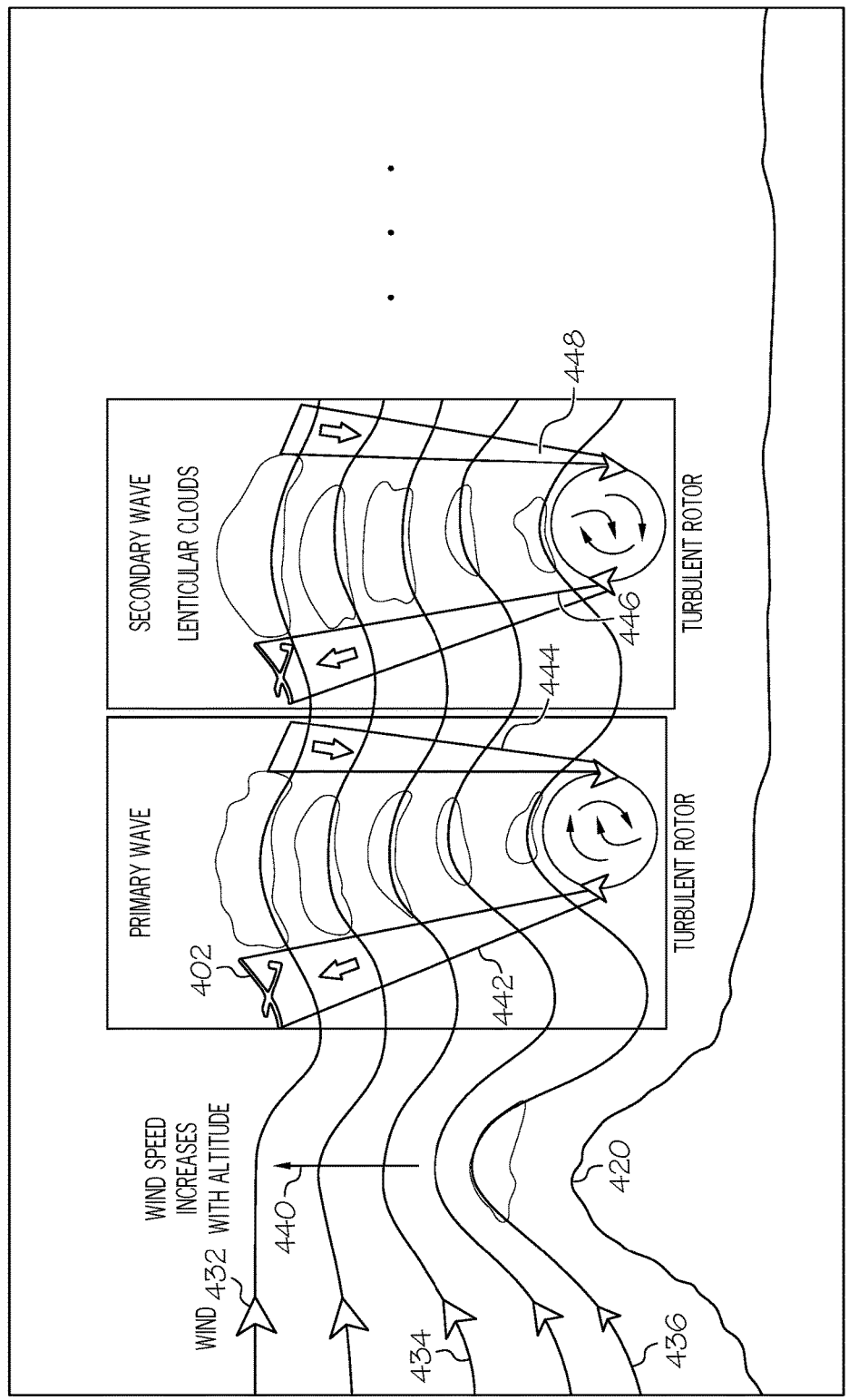
FIG. 4 is a diagram of a soaring aircraft using wave lift.

FIG. 4 is a diagram 400 of a soaring aircraft 402 using wave lift. Wave lift is dependent on wind blowing against a geographic feature should as a mountain, hill, cliff or ridge line, typically as speeds of more than 25 miles per hour. The wind 432, 434, 436 flows over the top of the mountain 420 or other obstruction and down the opposite side of the mountain. The speed increases with altitude 440. On the leeward side of the mountain 420 the wind bounces off a layer of stable air 430 near the ground and is deflected upward 442 many thousands of feet to stable air where it bounces downward again 444. This wave action can occur many times in succession 446, 448 and is very similar to what is observed when water flows over a submerged log in a stream.

Figure 5:
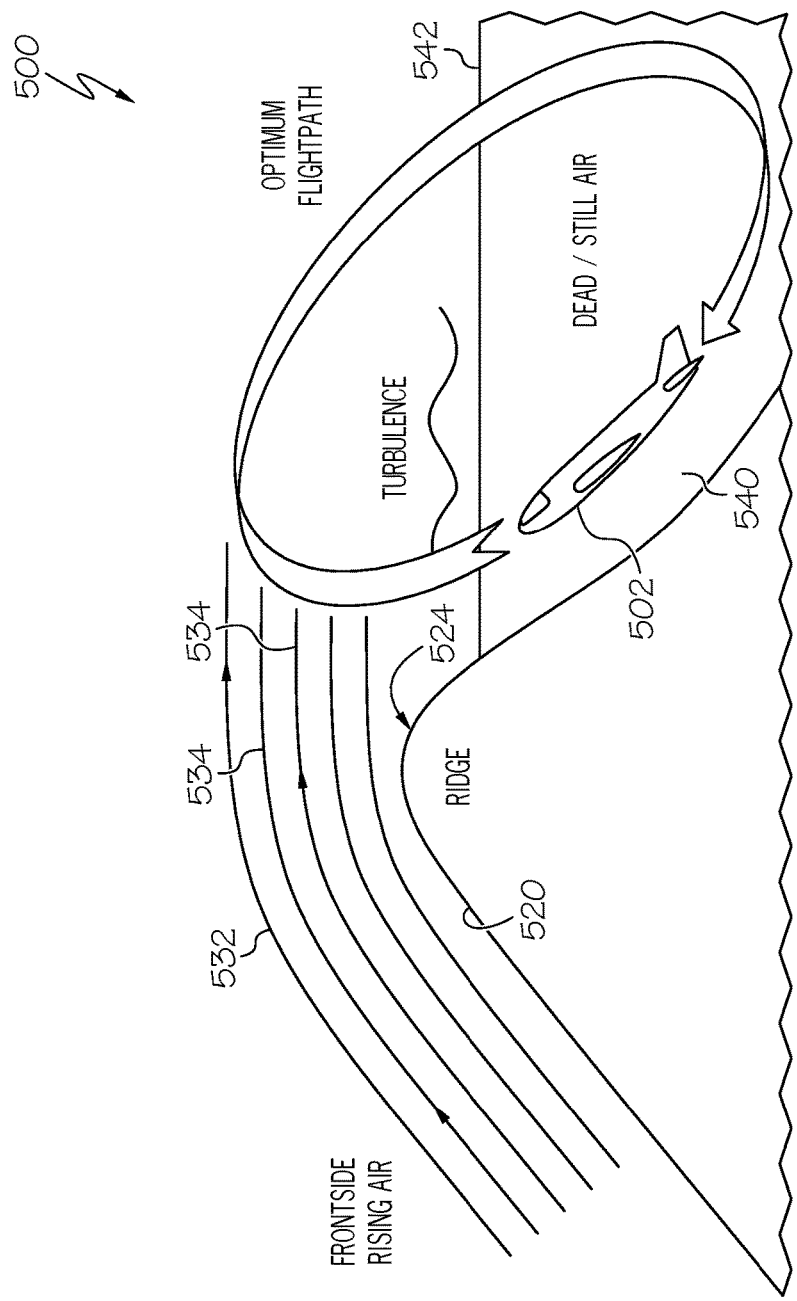
FIG. 5 is a diagram of a soaring aircraft using dynamic lift.

FIG. 5 is a diagram 500 of a soaring aircraft 502 using dynamic lift. Using dynamic lift, also called dynamic soaring, the energy is gained by repeatedly crossing the boundary between air masses of different horizontal velocity rather than by rising air. Such zones of high "wind gradient" are usually too close to the ground to be used safely by gliders. In this example, the general wind direction is shown moving from left to right 532, 534, 536 over the top of the ridge 520. Note the ridge 520 is optional. It is important to note that boundaries between different air masses can occur without these mountain geographic features. On the leeward side of the mountain 524, the wind near the ground 540 is dead or still. A boundary 542 is created between the different air masses layers as shown.

Flight Path Communications

Figure 6:
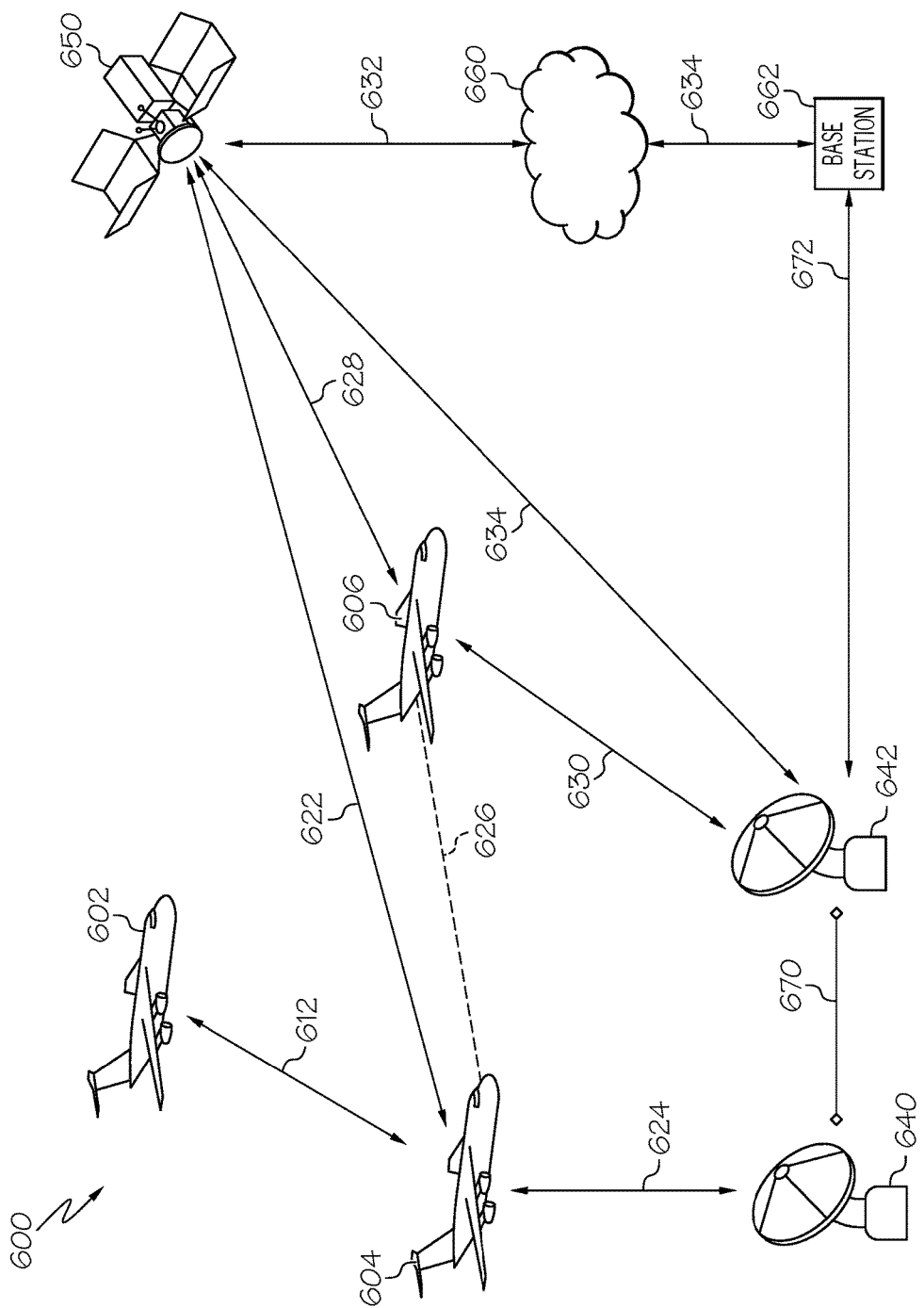
FIG. 6 is a diagram of three aircraft sharing lift data from various sources.

FIG. 6 is an example 600 of three aircraft 602, 604, 606 sharing lift data from various sources. To begin only one of the aircraft 602, 604, 606 may be updating a flight path according to the claimed invention. The other aircraft could be flying routes not using flight path information disclosed herein. For simplicity, assume aircraft 602 is not using a flight path determined by the presently claimed invention. Rather, aircraft 602 is sharing lift data over wireless communication link 612 back to soaring aircraft 604, which in turn is sharing lift data over wireless communication link 626 to aircraft 606. The information shared can be from one or more onboard sensors (not shown) on aircraft 602. Soaring aircraft 604 and 606 are each shown communicating with ground weather stations 640 over wireless communication link 624 and 642 over wireless communication link 630, respectively. These ground stations can provide lift related data including weather data. Also shown is an alternative communication to a satellite 650 over wireless communications links 622, 628, and 634. All of this can be shared over a global network with a base station 662 for assisting with flight path calculations and storage of previous flight paths. Lift data may be stored temporarily or permanently on aircraft 604 and aircraft 606, at base stations 662, or a combination of thereof. As shown by the arrows in FIG. 6, aircraft 604 and aircraft 606 and ground weather stations 640, 642 communicate lift data throughout its flight such that on aircraft 604 and aircraft 606. Lift data is derived from measuring heat transfer and gas exchange between soil, vegetation, and/or surface water and the atmosphere caused by near-ground turbulence. Variables often measured or derived include net radiation, sensible heat flux, latent heat flux, ground heat storage, and fluxes of trace gases important to the atmosphere, biosphere, and hydrosphere.

Lift data is also received from ground weather stations 640, 642. Aircraft 604 and aircraft 606 also relay such atmospheric information data to satellites 650, which also communicate with ground weather stations 640, 642. In addition, aircraft 604 and aircraft 606 may also relay such data to one or more other aircraft 602 in order to coordinate flights paths and/or locations, share atmospheric information data, and avoid collisions or overcrowding an airspace. This continuous and contemporaneous relay of atmospheric information between aircraft 604 and aircraft 606, atmospheric information ground weather stations 640, 642, satellite 650 and base station 662 constitutes in part an atmospheric data network 662.

Figure 7:
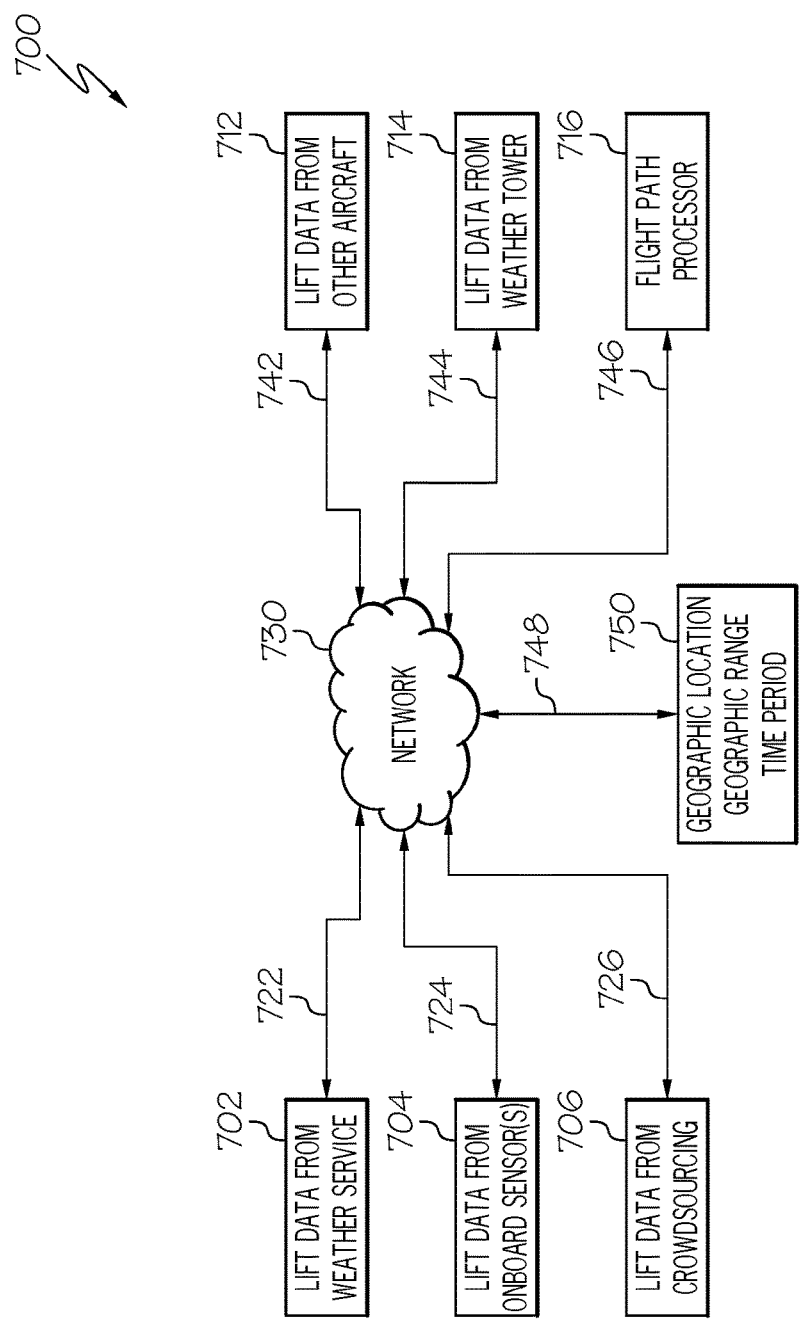
FIG. 7 is a diagram of the major sources of data input for a flight path processor.

FIG. 7 is a diagram 700 of the major sources of data input for a flight path processor 714. The flight processor 714 equipped with communicating over network link 744 to network 730, that is, receive, process, transmit, relay and the like. Shown communicatively coupled to the network 730 is lift data from onboard sensor from aircraft 604 and 606. Lift data from crowdsourcing data 706 is also coupled to the network 730. Also shown is lift data from other aircraft 712 and lift data from a ground weather station or weather tower 714. The flight path processor 714 is connected to network 730, e.g., the Internet or a local area network 730.

The links 722, 724, 726, 742, 744, 746, 748, 750 may be directly or indirectly coupled to network 730. For example, hardwired network connection or wirelessly coupled to network 730 via wireless communication channel. Although many aspects are shown as discrete systems, it is within the true scope and spirit of the presently claimed invention for these to be combined into one system.

The flight path processor 714 may include, but are not limited to: a personal computer, a server computer, a series of server computers, a mini computer, and a mainframe computer. The flight path processor 714 may be a single server or a series of servers running a network operating system, examples of which may include but are not limited to Microsoft Windows Server or Linux. The flight path processor 714 may execute a web server application, examples of which may include but are not limited to IBM Websphere or Apache Webserver™, that allows for HTTP (i.e., HyperText Transfer Protocol) access to other systems via network 730. Moreover, network 730 may be connected to one or more secondary networks e.g., network 730, examples of which may include but are not limited to: a local area network; a wide area network; or an intranet, for example. Three important inputs 750 to the flight path processor 714 are shown. These inputs include 1) Geographic Location (GL), 2) Geographic Range (GR), and 3) Time Period (TP). The flight path processor uses these inputs along with the lift data sources 1, 2, 3 . . . (LDS1, LDS2, LDS3, . . . ) in a function f(GL, GR, TP, LDS1,LDS2, LDS3, . . . ) may include using history and machine learning algorithms, such as Bayesian algorithms and neural networks. The machine learning algorithms can include both supervised and unsupervised algorithms.

The flight path processor calculates routes in three main steps as follow:

1) Generate estimates of sensible "average" values for the climb rate and maximum height of each thermal using the fine-grained weather model. The term sensible means to throw out any values that are beyond a given standard deviation. For a more conservative approach, these "averages" values should be close to minima.
2) Calculate approximate times to get from any thermal to the goal point. Using the average values for climb rates and maximum heights, calculate the travel time between pairs of thermals. This will consist of the time taken to rise to a suitable height at the first thermal as well as the travel time to the second thermal. These approximations determine which regions of space are most promising by calculating the shortest path from each node to the end node. This can be done using a single shortest path calculation from the end point.

3) Use the approximate times combined with detailed information about the points which are close by in space and time to choose where to go next. While flying to a thermal, calculate the quickest path from this thermal to the end node in a more detailed network. The more detailed network includes multiple nodes for all thermals, discretized across both time and heights. The approximations found in the previous step can be added to the paths found in order to rank paths and to ensure that full paths are always known. When a new path is required, the best one found so far is used to choose the next thermal to fly towards. The choice of flight path could incorporate previously computed flight paths in order to estimate flight path reliability.

Lift Data

Figure 8:
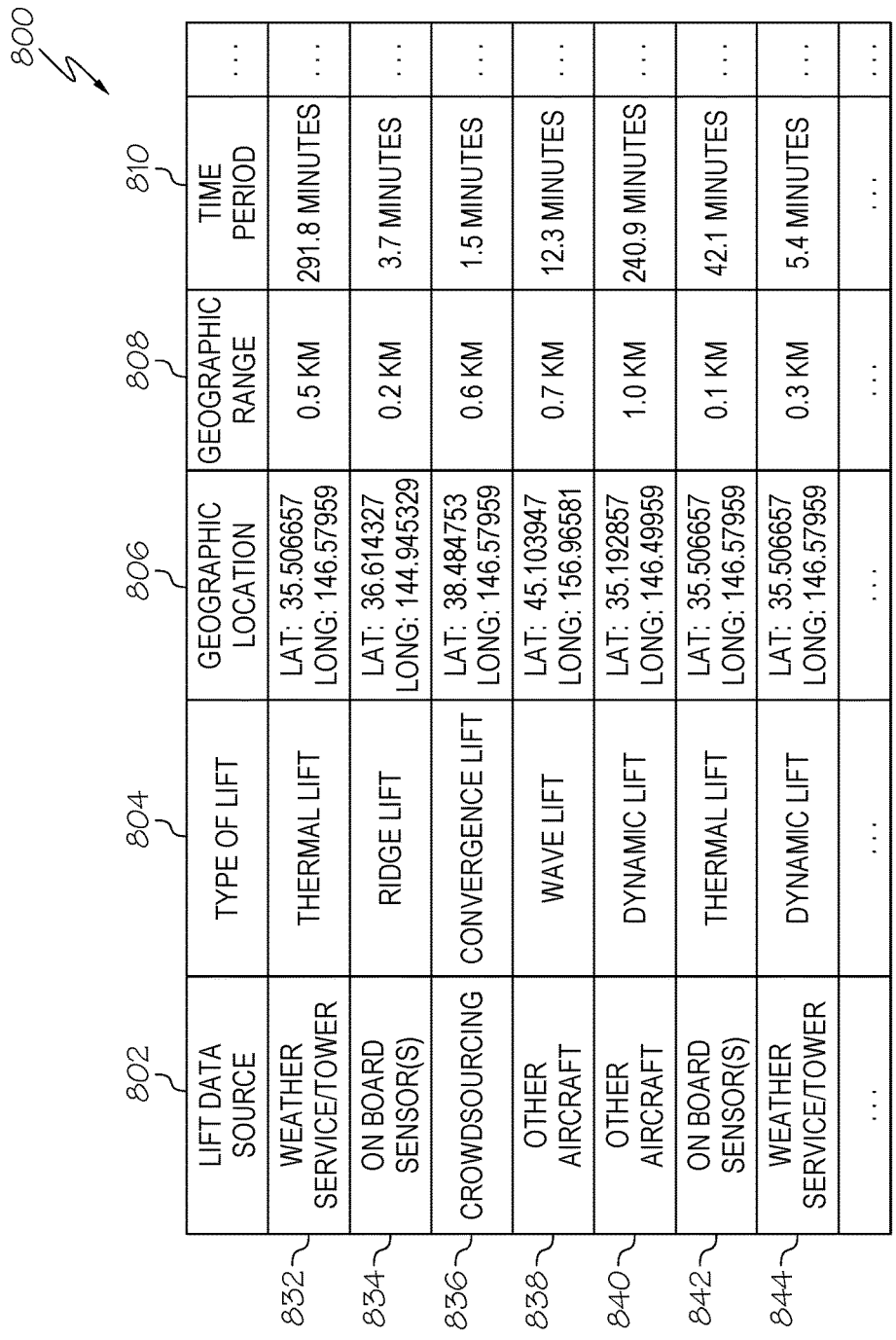
FIG. 8 is a table of lift data from various sources, locations, and time periods.

FIG. 8 is a table 800 of lift data used with by the flight path processor 714. As shown a column with a lift data source 802 is uniquely identified. A column of the type of lift 804 along with a geographic region 806, column 808 with a geographic range, and column 810 is the time period of the forecast. For example in row 832 a WEATHER SERVICE is the source of the lift data for a THERMAL LIFT, for a specific geographic location, with a geographic range of 0.5 KM for 300 minutes. Likewise, in row 844, shown is a WEATHER TOWER providing the course of the lift data, the type of lift is a dynamic lift, for a same geographic location as shown in row 832, however the geographic range is only 0.3 KM and the time 30 minutes.

Flow Chart

Figure 9:
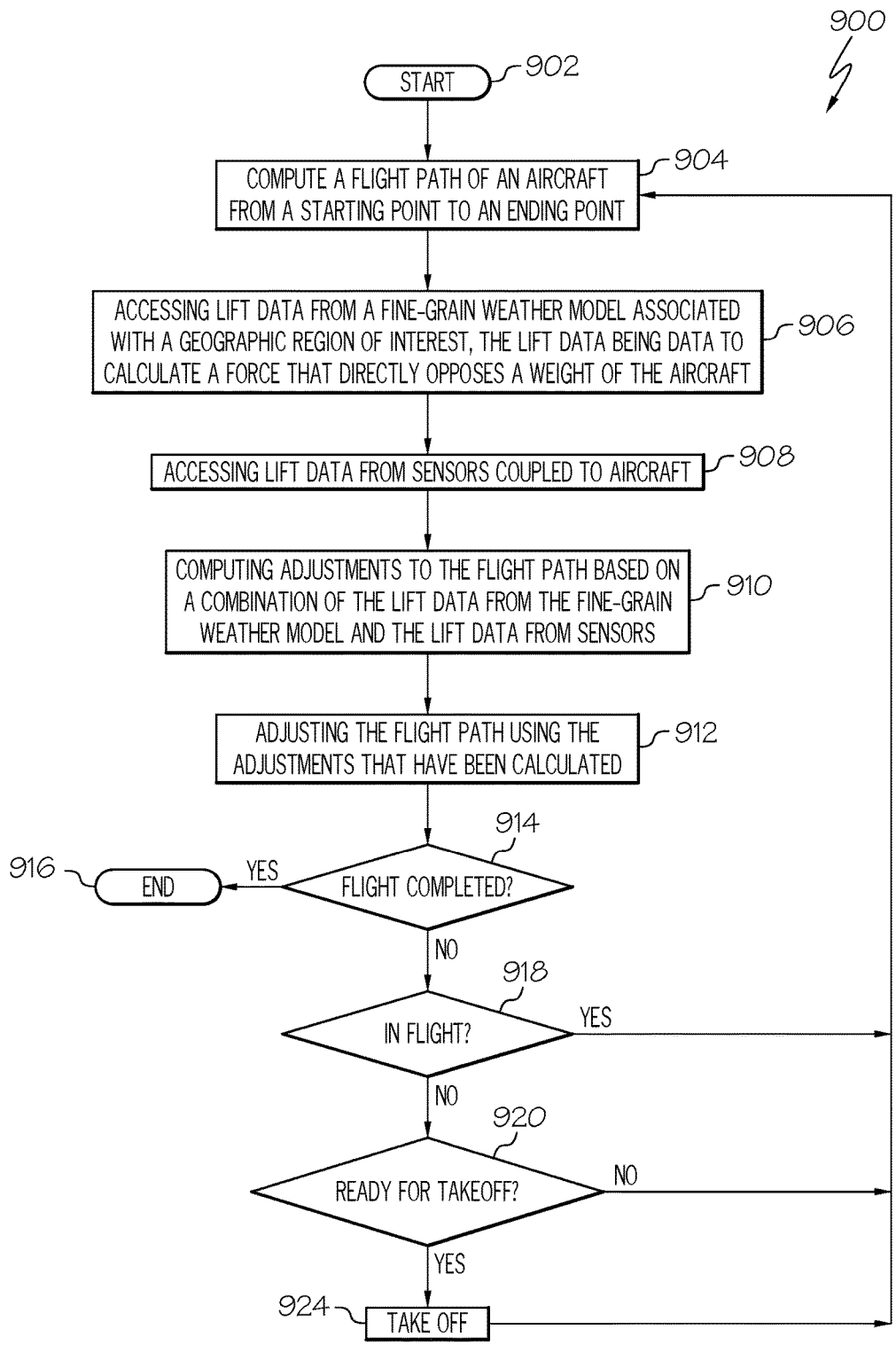
FIG. 9 is a flow chart of processing lift data.

FIG. 9 is a flow chart of is a flow chart 900 of processing lift data 800 by the flight path processor 714. The process begins in step 902 and immediately proceeds to step 904 in which a flight path of an aircraft is computed or pre-computed from a starting point to an ending point which incorporates predicted weather effects at different points in space and time. Step 904 is a first step of an iterative loop of steps 904 through 916. Specifically, the first step 906 in the iterative loop, lift data from a fine-grained weather model associated with a geographic region of interest is accessed. The lift data is data to calculate a force that directly opposes a weight of the aircraft. Next, in step 908, lift data is accessed from one or more sensors coupled to the aircraft. In step 910, adjustments to the flight path are computed based on a combination of the lift data from the fine-grained weather model and the lift data from the sensors. Step 912 adjustments are computed to the flight path based on a combination of the lift data from the fine-grain weather model and the lift data from sensors. A test is made if the flight is completed in step 914. If the flight is completed, then the process ends in step 916. Otherwise, while the flight is underway the next step 918 is to test if the flight has indeed begun. If the flight has begun in step 918 then the process loops back to step 904. Otherwise, if the flight has not yet begun in step 918, a test is made to determine if the flight is ready for takeoff in step 920. If the flight is not ready for takeoff then the process loops back to step 904. Otherwise, the flow continues where the flight takes off in step 924, and the process returns to the iterative loop of step 904 as shown.

Information Processing System

Figure 10:
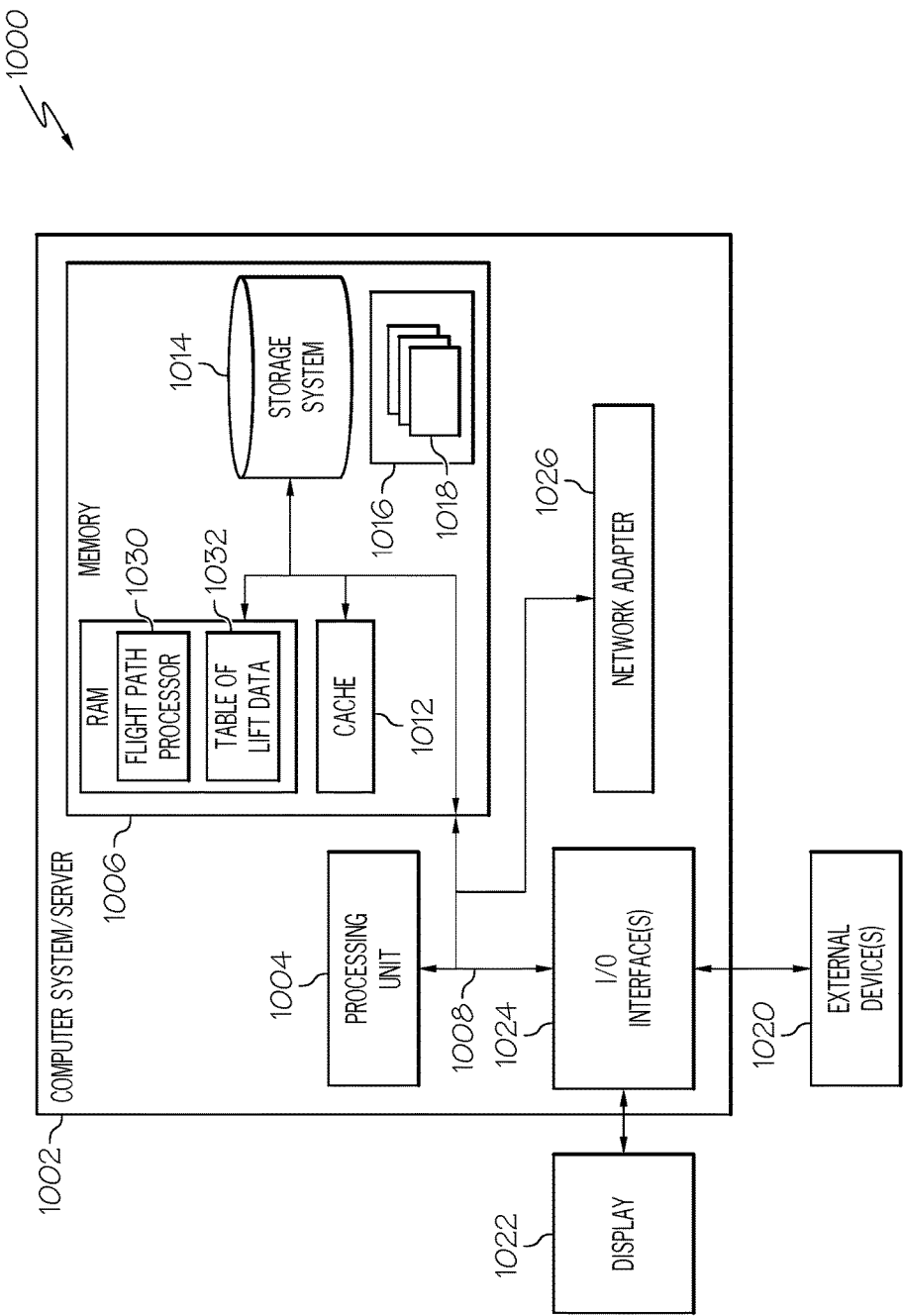
FIG. 10 is a block diagram of an information processing system that may be used as a flight path processor.

Referring now to FIG. 10, this figure is a block diagram 1000 illustrating an information processing system that can be utilized in embodiments of the present invention for flight path processor 714. Any suitably configured processing system can be used as the information processing system 1002 in embodiments of the present invention. The components of the information processing system 1002 can include, but are not limited to, one or more processors or processing units 1004, a system memory 1006, and a bus 1008 that couples various system components including the system memory 1006 to the processor 1004. The system memory 1006 can include the computer code for the flight path processor 1030 as well as the lift data table 1032 of FIG. 8.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for adjusting a flight path of an aircraft, the method comprising:
   computing a flight path of an aircraft from a starting point to an ending point which incorporates predicted weather effects at different points in space and time;
   during a flight path performing each of:
      accessing lift data from a fine-grained weather model associated with a geographic region of interest, the lift data being data to calculate a force that directly opposes a weight of the aircraft, and the fine-grained weather model providing weather to the geographic region of interest being less than a kilometer with a type of lift from categories of a ridge lift, a wave lift, and a dynamic soaring lift along with a time period in minutes in which the lift data for the type of lift is applicable;
      accessing lift data from sensors on the aircraft;

accessing lift data from a group of people that elect to share data for a specific flight path;
computing adjustments to the flight path based on a combination of the lift data from the fine-grain weather model, the lift data from sensors and the lift data from the group of people; and
adjusting the flight path using the adjustments that have been computed.

2. The computer-implemented method of claim 1, further comprising:
sending the flight path as it is adjusted to a second aircraft.

3. The computer-implemented method of claim 2, further comprising:
receiving adjustments to the flight path from the second aircraft in order to avoid collisions therewith.

4. The computer-implemented method of claim 1, further comprising:
receiving, on a second aircraft, lift data from sensors coupled to the aircraft; and
computing adjustments to the flight path of the aircraft is performed on a second aircraft; and
receiving from the second aircraft the adjustments which have been computed on the second aircraft.

5. The computer-implemented method of claim 1, further comprising:
receiving, on a second aircraft, lift data from sensors coupled to the aircraft; and
wherein at least a portion of the computing adjustments to the flight path of the aircraft is performed by both the aircraft and the second aircraft.

6. The computer-implemented method of claim 1, wherein the aircraft is unpowered.

7. The computer-implemented method of claim 1, wherein the aircraft is powered by one or more engines.

8. The computer-implemented method of claim 1, wherein at least one of
computing a flight path of an aircraft from the starting point to the ending point, and
adjusting the flight path using the adjustments that have been computed, includes using a portion of the flight path that has been previously computed to rank a reliability of the portion of the flight path.

9. An aircraft flight path processor system comprising:
a memory;
a processor communicatively coupled to the memory, where the processor is configured to perform
computing a flight path of an aircraft from a starting point to an ending point which incorporates predicted weather effects at different points in space and time;
during a flight path performing each of:
accessing lift data from a fine-grained weather model associated with a geographic region of interest, the lift data being data to calculate a force that directly opposes a weight of the aircraft, and the fine-grained weather model providing weather to the geographic region of interest being less than a kilometer with a type of lift from categories of a ridge lift, a wave lift, and a dynamic soaring lift along with a time period in minutes in which the lift data for the type of lift is applicable;
accessing lift data from sensors on the aircraft;
accessing lift data from a group of people that elect to share data for a specific flight path;
computing adjustments to the flight path based on a combination of the lift data from the fine-grain weather model, the lift data from sensors and the lift data from the group of people; and
adjusting the flight path using the adjustments that have been computed.

10. The aircraft flight path processor system of claim 9, further comprising: sending the flight path as it is adjusted to a second aircraft.

11. The aircraft flight path processor system of claim 10, further comprising: receiving adjustments to the flight path from the second aircraft in order to avoid collisions therewith.

12. The aircraft flight path processor system of claim 9, further comprising:
receiving, on a second aircraft, lift data from sensors coupled to the aircraft; and
computing adjustments to the flight path of the aircraft is performed on a second aircraft; and
receiving from the second aircraft the adjustments which have been computed on the second aircraft.

13. The aircraft flight path processor system of claim 9, further comprising:
receiving, on a second aircraft, lift data from sensors coupled to the aircraft; and
wherein at least a portion of the computing adjustments to the flight path of the aircraft is performed by both the aircraft and the second aircraft.

14. The aircraft flight path processor system of claim 9, wherein the aircraft is unpowered.

15. The aircraft flight path processor system of claim 9, wherein the aircraft is powered by one or more engines.

16. The aircraft flight path processor system of claim 9, wherein at least one of
computing a flight path of an aircraft from the starting point to the ending point, and
adjusting the flight path using the adjustments that have been computed, includes using a portion of the flight path that has been previously computed to rank a reliability of the portion of the flight path.

17. A non-transitory computer program product for adjusting flight path of an aircraft, the non-transitory computer program product comprising a computer readable storage medium having program code embodied therewith, the program code executable on processor to perform:
computing a flight path of an aircraft from a starting point to an ending point which incorporates predicted weather effects at different points in space and time;
during a flight path performing each of:
accessing lift data from a fine-grained weather model associated with a geographic region of interest, the lift data being data to calculate a force that directly opposes a weight of the aircraft, and the fine-grained weather model providing weather to the geographic region of interest being less than a kilometer with a type of lift from categories of a ridge lift, a wave lift, and a dynamic soaring lift along with a time period in minutes in which the lift data for the type of lift is applicable;
accessing lift data from sensors on the aircraft;
accessing lift data from a group of people that elect to share data for a specific flight path;
computing adjustments to the flight path based on a combination of the lift data from the fine-grain weather model, the lift data from sensors and the lift data from the group of people; and
adjusting the flight path using the adjustments that have been computed.

* * * * *